(12) United States Patent
Zotov et al.

(10) Patent No.: US 8,539,383 B2
(45) Date of Patent: Sep. 17, 2013

(54) PROCESSING FOR DISTINGUISHING PEN GESTURES AND DYNAMIC SELF-CALIBRATION OF PEN-BASED COMPUTING SYSTEMS

(75) Inventors: Alexander J. Zotov, Sammamish, WA (US); Reed Townsend, Seattle, WA (US); Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 12/500,479

(22) Filed: Jul. 9, 2009

(65) Prior Publication Data

US 2010/0017758 A1 Jan. 21, 2010

Related U.S. Application Data

(63) Continuation of application No. 11/101,647, filed on Apr. 8, 2005, now Pat. No. 7,577,925.

(51) Int. Cl.
*G06F 3/033* (2013.01)
*G09G 5/00* (2006.01)

(52) U.S. Cl.
USPC ............ 715/863; 715/862; 345/173; 345/178

(58) Field of Classification Search
USPC ........................... 715/862, 863; 345/173, 178
See application file for complete search history.

(56) References Cited

U.S. PATENT DOCUMENTS

| | | | | |
|---|---|---|---|---|
| 4,710,758 A | * | 12/1987 | Mussler et al. | 345/178 |
| 4,752,655 A | * | 6/1988 | Tajiri et al. | 345/174 |
| 5,252,951 A | | 10/1993 | Tannenbaum et al. | |
| 5,566,248 A | | 10/1996 | Ulrich | |
| 5,570,113 A | | 10/1996 | Zetts | |
| 5,603,053 A | | 2/1997 | Gough et al. | |
| 5,677,710 A | | 10/1997 | Thompson-Rohrlich | |
| 5,796,406 A | | 8/1998 | Shigematsu et al. | |
| 5,862,256 A | | 1/1999 | Zetts et al. | |
| 5,903,268 A | * | 5/1999 | Hirayama | 715/799 |
| 6,262,718 B1 | * | 7/2001 | Findlay et al. | 345/178 |
| 6,353,434 B1 | * | 3/2002 | Akebi et al. | 345/173 |
| 6,411,283 B1 | * | 6/2002 | Murphy | 345/173 |
| 6,801,191 B2 | | 10/2004 | Mukai et al. | |
| 2002/0015064 A1 | | 2/2002 | Robotham et al. | |
| 2003/0025680 A1 | * | 2/2003 | Tsang | 345/178 |
| 2005/0093831 A1 | * | 5/2005 | Wang | 345/173 |
| 2006/0001656 A1 | | 1/2006 | LaViola et al. | |
| 2006/0022955 A1 | * | 2/2006 | Kennedy | 345/173 |
| 2006/0026521 A1 | * | 2/2006 | Hotelling et al. | 715/702 |

\* cited by examiner

*Primary Examiner* — Tadeese Hailu
(74) *Attorney, Agent, or Firm* — Woodcock Washburn, LLP (57) ABSTRACT

Systems, methods, and computer-readable media process and distinguish user input device gestures, such as gestures input via a pen in a pen-based computing system, e.g., to quickly and reliably distinguish between electronic ink entry, single taps, double taps, press-and-hold actions, dragging operations, and the like. Systems, methods, and computer-readable media also are provided for dynamically calibrating a computer system, e.g., calibrating a displayed input panel view based on input data recognized and received by a digitizer. Such systems and methods may operate without entering a dedicated or special calibration application, program, or routine.

11 Claims, 4 Drawing Sheets

PROCESSING FOR DISTINGUISHING PEN GESTURES AND DYNAMIC SELF-CALIBRATION OF PEN-BASED COMPUTING SYSTEMS

CROSS-REFERENCE TO RELATED APPLICATIONS

The present application claims priority to and is a continuation of U.S. patent application Ser. No. 11/101,647, filed on Apr. 8, 2005, entitled, "PROCESSING FOR DISTINGUISHING PEN GESTURES AND DYNAMIC SELF-CALIBRATION OF PEN-BASED COMPUTING SYSTEMS," now U.S. Pat. No. 7,577,925, granted Aug. 18, 2009, the contents of which are hereby incorporated by reference in its entirety.

TECHNICAL FIELD

The present invention generally relates to systems, methods, and computer-readable media with computer-executable instructions stored thereon for processing and/or distinguishing various pen gestures from one another, e.g., in pen-based computing systems. Additional aspects of this invention relate to systems, methods, and computer-readable media for dynamically self-calibrating computer displays, digitizers, and/or input systems, for e.g., pen-based computing systems.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, and the like.

Recently, however, pen-based computing systems, such as tablet PCs, personal digital assistants, and the like, have been increasing in popularity. In pen-based computing systems, user input advantageously may be introduced using an electronic "pen" or stylus (e.g., akin to writing with a conventional pen or pencil on a piece of paper). Indeed, in at least some pen-based computing systems, all user input is capable of being entered and manipulated using a pen, and the user interface is fully controllable using only the pen.

In at least some pen-based computing systems and the like, the pen input device is called upon to perform multiple different tasks, such as entering electronic ink, tapping icons or other objects (akin to a conventional left mouse button click), double tapping icons or other objects, initiating press-and-hold actions (akin to a conventional right mouse button click), moving icons or other objects, targeting on icons or other objects, resizing objects, and the like. These tasks may be accomplished by performing various different "gestures" using the pen. In order to avoid having the user enter data to tell the computer what type of input he/she is intending to enter before entering it, pen-based computing systems have developed algorithms that allow the system to "automatically" determine the intended type of input before, during, and/or after the input is being entered. In many situations, however, improving the pen-based computing system's ability to correctly recognize one or more types of system gestures will degrade its ability to quickly or correctly recognize other pen operations or gestures, sometimes even very basic pen operations or gestures.

For example, when attempting to recognize a pen "tap" gesture (akin to a mouse click action), one of the main factors evaluated by at least some pen-based computing systems relates to the amount of pen movement during the pen-down gesture that potentially constitutes the tap (e.g., the system has a threshold parameter indicating the amount of distance the pen is allowed to "skid" or move during a gesture while still having the system recognize the gesture as a tap). Often, particularly when people casually tap the pen down on the digitizer surface, the pen will skid or move a substantial amount during those few milliseconds while it is in contact with the digitizer. If the computing system were to simply start generating "mouse move" messages corresponding exactly to every pen movement action during a pen-down event (i.e., if the parameters for recognizing a "tap" gesture did not allow any pen movement in the X or Y coordinate directions during a tap), an icon (or other object) in a menu or other display region may be made to move (e.g., by activating a drag operation) instead getting clicked, such that the icon (or other object) would change position rather than getting selected. Such strict input threshold parameters would make it difficult to perform a tap gesture, which would be very frustrating to users.

Therefore, conventional pen-based computing systems include threshold parameters and tolerances that attempt to produce correct input gesture recognition despite the fact that the user's input may have been somewhat "sloppy" or less than ideal. For example, in commercially available pen-based computing systems that operate Microsoft® Windows XP Tablet PC Edition Version 2002, when a "pen-down" event occurs, the system waits and does not generate "mouse move" events for a short time period after the pen comes in contact with the digitizer surface. After a few milliseconds, the system will be more likely to correctly determine whether the pen is going to continue traveling (e.g., consistently in one direction more than a predetermined threshold amount if the user is entering ink or dragging an object), or whether the pen will quickly stop moving or not move (e.g., thereby representing a "tap" gesture). As soon as the correct gesture is recognized (or believed to be recognized), e.g., based on one or more predetermined or preset threshold parameters, the previously delayed mouse move events may be sent, if necessary, and the processing may continue based on this gesture recognition.

Accordingly, pen input and gesture recognition in at least some existing pen-based computing systems evaluate various input characteristics during a pen-down event, and by balancing the different input characteristics against one another, the type of input is recognized (either correctly or incorrectly), and this input then is acted on by the system. If an operating system wanted to allow users to be able to input very sloppy taps (e.g., with substantial pen movement or skid) and still recognize that input gesture as a tap, then the operating system also would have to wait longer to make a decision as to whether a particular input gesture constitutes a "tap" gesture or a "drag" gesture or an ink input gesture, because the pen may move in the same general way during a sloppy tap vs. during ink entry and/or during a drag operation. The sloppier the tap input gesture that is allowed, the longer the recognition delay time period needs to be. On the other hand, this extended delay results in a perceived latency when the user does not intend to make a tap gesture. More specifically, when users intend to enter electronic input ink or perform a dragging operation, the user may feel as if the system is freezing briefly, almost as if the system is not capable of keeping up with the user input, because the system delays to determine whether a sloppy tap was input rather than the ink or drag input. Therefore, this "balancing act" can degrade the quality of drawing and dragging operations and the user's experience with pen-based computing systems.

The "tap" vs. ink entry and/or dragging operations are not the only gesture operations that may cause recognition delays in pen-based computing systems. For example: (a) improving the pen-based computing system's ability to correctly recognize double taps degrades its ability to correctly recognize consecutive single taps on closely spaced icons or objects (and vice versa); (b) improving the pen-based computing system's ability to correctly recognize "press-and-hold" gestures degrades its ability to correctly recognize ink entry and/or dragging operations (and vice versa); and (c) improving the pen-based computing system's ability to improve targeting activities degrades its ability to recognize ink entry and/or dragging operations (and vice versa). While the Microsoft® Windows XP Tablet PC Edition Version 2002 made significant efforts to strike the right balances and provide suitable threshold parameters for recognizing these different types of input and gestures, improved gesture recognition ability and/or improved speed of correct gesture recognition would further enhance the pen-based computing system user's experience and would be a welcome addition to an operating system.

Pen-based computing systems also have "calibration" issues, issues that are not experienced with at least some other types of computing systems. For example, due to mechanical limitations relating to pens, displays, and digitizers, the digitizer hardware typically reports interaction pen positions (e.g., X,Y coordinates) that do not exactly match the location on the display where the visual target is located (e.g., this may occur because the display device that generates the visual target is different and independent from the digitizer device used to recognize the location of pen during input interaction). Other sources of calibration issues may include, for example: electromagnetic noise caused by hard drives and/or power supplies, sensitivity characteristics of the digitizer hardware (e.g., the digitizer's sensitivity may change with temperature, elevation, humidity, etc., such that its behavior does not stabilize until after a "break-in" period, and correct, perfect calibration is not possible from the factory due to this "break-in" period, etc.), and the like. To correctly interact, the user must touch the pen down at the digitizer location where the digitizer believes the icon or object to be located, irrespective of where the icon or object actually exists on the display screen. If the difference between the visual position of the target on the screen and the required digitizer interaction position on the digitizer is small, the user typically will not notice any problem and everything will work in the manner it should. However, in practice, this difference can be quite significant. As a result, a user may be physically pointing to and interacting with one location on the display screen, but he/she actually may be interacting with an offset location in the system as recognized by the underlying digitizer. This difference especially may manifest itself during tasks of "fine targeting," such as when a user attempts to resize an input panel by dragging the panel's edge, when a user attempts to click on a small icon, button, or other object, such as the maximize, restore, or close buttons on an input panel, or the like.

Typically, these differences may be addressed using one or more "calibration" techniques, during which the pen position reported by the digitizer hardware is adjusted based on expected user input and interaction with a visual display during a calibration procedure. Examples of calibration procedures used for digitizers and/or other hardware involved in pen-based computing systems include "linearization" calibration, "four-point" procedure calibration, and the like.

Pen-based computing system manufacturers also may perform calibration procedures on pen-based computing system hardware before it is shipped for sale. For example, some manufacturers may fully calibrate a given machine coming off the assembly line (e.g., using a 256 point calibration procedure), and then they may use this same calibration data on the next predetermined number of machines coming off the line (e.g., perhaps the next thousand machines or more). While the limitations in extending the calibration data from one machine to other, independent machines are readily apparent, it would cost too much in time delays to perform this complex calibration procedure on every machine coming off the line. Other hardware manufacturers may do little or no actual calibration and rely on the likelihood that their manufacturing procedures have closely aligned the digitizer and the LCD screen and/or that the underlying circuitry of the computing system will not generate sufficient noise to substantially disturb the actual user experience. The limitations inherent in these calibration procedures (or lack thereof) are readily apparent, and these procedures do nothing to correct for calibration drift that occurs over time and/or system noise generated by electronic components making up the system.

While many pen-based computing systems allow users to enter a "calibration mode" or program, such dedicated modes rely upon the user's knowledge of the need for calibration and knowledge of the availability of such a mode or program. Moreover, the calibration activities and effectiveness available in such modes can be relatively limited. Even when conducted, these user-initiated calibration procedures typically are time-consuming, inconvenient, and temporary fixes. Accordingly, improved calibration procedures would be a welcomed addition to pen-based computing systems.

SUMMARY

Aspects of the present invention relate to systems, methods, and computer-readable media for processing and distinguishing user input device gestures, such as gestures input via a pen in a pen-based computing system. Such systems and methods, in accordance with at least some examples of this invention, may include: (a) running an application program on a computer system; (b) sending a gesture profile from the application program to an operating system of the computer system, wherein the gesture profile defines an expected input gesture type for at least a first portion of an input panel; and (c) setting at least one gesture recognition parameter for use when receiving user input (e.g., entered via an input system, such as a digitizer or the like) directed to the first portion of the input panel based on the sent gesture profile. Additional systems and methods according to at least some examples of this invention may include: (a) running an application program on a computer system, wherein at least a portion of an input panel associated with the application program is displayed by the computer system, and wherein the input panel includes at least a first input portion and a second input portion; (b) receiving user input through the input panel (e.g., input via a digitizer, etc.); (c) determining if the user input is directed toward one of the first input portion or the second input portion; (d) sending a gesture profile from the application program to an operating system of the computer system at least when it is determined that the user input is directed toward one of the first input portion or the second input portion, wherein the gesture profile includes a first gesture profile when the user input is determined to be directed toward the first input portion, and wherein the gesture profile includes a second gesture profile when the user input is determined to be directed toward the second input portion; and (e) setting at least one gesture recognition parameter based on the sent gesture profile.

Aspects of the present invention also relate to systems and methods for dynamically self-calibrating a computer system, e.g., calibrating a displayed input panel view with respect to input data recognized and received by a digitizer. Such systems and methods may include: (a) receiving plural user inputs directed toward a first target (e.g., via an input system, optionally including a digitizer and/or display screen); (b) determining first offset data for at least some of the plural user inputs directed toward the first target (e.g., using a computer processor system, such as one or more microprocessors), wherein the first offset data indicates a difference in at least one of distance or direction between a visual location of the first target (e.g., as shown on a display device) and a hardware location (e.g., on a digitizer) corresponding to the visual location of the first target; (c) receiving plural user inputs directed toward a second target (e.g., at a computer processor system, such as one or more microprocessors); (d) determining second offset data for at least some of the plural user inputs directed toward the second target (e.g., using a computer processor system, such as one or more microprocessors), wherein the second offset data indicates a difference in at least one of distance or direction between a visual location of the second target (e.g., as shown on a display device) and a hardware location (e.g., on the digitizer) corresponding to the visual location of the second target; (e) determining if the first offset data differs from the second offset data by more than a threshold amount (e.g., in distance and/or direction, for example, using a computer processor system, such as one or more microprocessors); and (f) changing at least some calibration data associated with the second position, in at least some instances, when the first offset data differs from the second offset data by more than the threshold amount (e.g., using a computer processor system, such as one or more microprocessors). The various user inputs may be directed to the various target regions and/or received by the input system without entering or activating a dedicated or special calibration application, program, or routine (e.g., an application, program or routine that expressly and/or solely requires user input for calibration purposes).

Additional systems and methods for dynamically self-calibrating an input system may include: (a) collecting offset data based on plural user inputs directed toward plural portions of an input panel (e.g., using a computer processor system, such as one or more microprocessors), wherein the offset data indicates a difference in at least one of distance or direction between a visual location of a target for an individual user input (e.g., as shown on a display device) and a hardware location (e.g., on a digitizer) corresponding to the respective visual location of the respective target for the respective individual user input, and wherein the plural user inputs are received without entering a dedicated or special calibration application, program, or routine; (b) determining whether to change calibration data associated with at least one portion of the input panel and/or the digitizer based on the offset data (e.g., using a computer processor system, such as one or more microprocessors); and/or (c) changing calibration data associated with a first portion of the input panel (e.g., using a computer processor system, such as one or more microprocessors), e.g., when the offset data associated with the first portion of the input panel differs by more than a threshold amount from the offset data associated with one or more other portions of the input panel.

Additional aspects of the invention relate to computer-readable media including computer-executable instructions stored thereon for performing various methods and/or operating various systems, including pen input gesture processing and self-calibration systems and methods like those described above.

BRIEF DESCRIPTION OF THE DRAWINGS

The above and other objects, features, and advantages of the present invention will be more readily apparent and more fully understood from the following detailed description, taken in connection with the appended drawings, in which.

DETAILED DESCRIPTION

As described above, aspects of the present invention relate to systems, methods, and computer-readable media for processing and using input information in pen-based computing systems, e.g., for better recognizing input gestures and/or for better calibrating the system hardware. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. TERMS

The following terms are used in this specification and, unless otherwise specified or clear from the context, the terms have the meanings provided below:

"Ink" (also called "digital ink" or "electronic ink")—A sequence or set of handwritten strokes. A sequence of strokes may include strokes in an ordered form. The sequence may be ordered in any suitable manner, such as by the time the stroke was captured and/or by where the stroke appears on a page. Other orders are possible. Electronic ink information may be stored in any desired manner, such as in an "ink serialized format," e.g., a format used for creating, storing, displaying, and manipulating electronic ink data in the Microsoft® Windows XP Tablet PC Edition Version 2002 operating system and/or the Microsoft® Windows Journal software application.

"Point"—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, .THETA.), three dimensional coordinates ((X, Y, Z), (r, .THETA., .rho.), (X, Y, t (where t is time)), (r, .THETA., t)), four dimensional coordinates ((X, Y, Z, t) and (r, .THETA., .rho., t)), and other techniques as known in the art.

"Stroke"—A sequence or set of captured points. A stroke may be determined in a number of ways, for example, using time (e.g., a stroke is all points encountered by the stylus during a predetermined time period or interval), using a predetermined number of points (e.g., a stroke is all points 1 through X where X is predefined), or using stylus contact with the digitizer surface (e.g., a stroke is all points encountered by the stylus between a pen-down event and a pen-up event). When rendered, the sequence of points making up a stroke may be connected with lines. Alternatively, a stroke may be represented as a point and a vector pointing in the direction of the next point. Further, a stroke may be referred to as a simple list (or array or table) of points. In short, a stroke is intended to encompass any representation of points or segments relating to ink, irrespective of the underlying representation of points and/or what connects the points.

"Pen"—Any type of user input device useful in entering electronic ink into and/or otherwise manipulating or controlling an electronic document and/or a computer operating system. The terms "pen" and "stylus" may be used interchangeably in this specification.

"Pen-Down Event"—An event that is initiated at the time a pen contacts a digitizer. Typically, a pen-down event will end at the time the pen leaves the digitizer surface (also called a "pen-up event" in this specification).

"Hover"—Positioning or locating a pen proximate or adjacent to a digitizer surface but not in contact with the surface, irrespective of whether the pen is moving. No specific time period or cessation of motion at a particular location or position is necessary for an action to constitute a "hover" action. For example, a "hover" may occur during the time period that a user continuously moves a pen toward and into contact with a digitizer surface. A "hover" action also may be akin to placement of a pointing device (such as a mouse's pointer) at a specific location in a display without "clicking" one of the mouse's buttons.

"Render" or "Rendered" or "Rendering"—The process of determining how graphics (and/or ink) are to be displayed, whether on a screen, printed, or output in some other manner.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. GENERAL DESCRIPTION OF VARIOUS ASPECTS OF THE INVENTION

A. Processing for Distinguishing User Input Device Gestures

Aspects of the present invention relate to methods, systems, and computer-readable media for processing and distinguishing various user input device gestures from one another, e.g., pen gestures in a pen-based computing system. Such methods may include: (a) running an application program on a computer system; (b) sending a gesture profile from the application program to an operating system of the computer system, wherein the gesture profile defines an expected input gesture type for at least a first portion of an input panel for the application program, wherein the expected input gesture type includes at least one member selected from the group of: an exclusive expected input gesture type, an excluded input gesture type, a preferential expected input gesture type, and a non-preferential expected input gesture type; and (c) setting at least one gesture recognition parameter for use when receiving user input directed to the first portion of the input panel based on the sent gesture profile. Optionally, the gesture profile may be sent by the application program in response to user input directed toward or received at the first portion of the input panel. Methods in accordance with at least some examples of the invention may be used to rapidly process and recognize user input and still correctly distinguish between various potential gestures or actions.

Exclusive expected input gesture types for the first portion of the input panel in accordance with at least some examples of this invention may include at least one member selected from the group of: exclusive tap input and exclusive electronic ink input. Preferential expected input gesture types for the first portion of the input panel in accordance with at least some examples of this invention may include at least one member selected from the group of: preference for a tap input over electronic ink input, preference for a tap input over a dragging operation input, preference for a single tap input over a double tap input, preference for a tap input over a press-and-hold operation input, preference for a single tap input directed toward two separate input panel portions over a double tap input directed toward a single input panel portion, preference for a press-and-hold operation input over electronic ink input, preference for a press-and-hold operation input over a dragging operation input, and preference for electronic ink input over other input gesture types (e.g., press-and-hold, tap, double tap, drag, etc). Excluded input gesture types for the first portion of the input panel in accordance with at least some examples of this invention may include at least one member selected from the group of: electronic ink input not possible, tap input not possible, double tap input not possible, a press-and-hold operation input not possible, and a dragging operation input not possible. Non-preferential expected input gesture types for the first portion of the input panel in accordance with at least some examples of this invention will indicate that the particular portion of the screen in question (i.e., the first portion of the input panel, in the examples above) will not be designated as preferentially receiving any specific type of input data gesture (e.g., this portion of the input panel then may have its input gestures processed in a conventional manner, with the normal or default system gesture recognition parameters, without preference for recognizing any one or more types of input gestures as compared to others).

In at least some examples of this invention, additional gesture profiles, e.g., profiles corresponding to additional portions of the input panel, may be sent from the application program to the operating system. These additional gesture profiles may include expected input gesture type information, e.g., information relating to one or more of the various expected gesture types described above. Like use of the gesture profile described above, the second gesture profile may be used by the operating system to set at least one gesture recognition parameter for use when receiving user input directed toward the second portion of the input panel.

Additional aspects of this invention relate to gesture input recognition processing methods (e.g., for pen input in a pen-based computing system) that may include: (a) running an application program on a computer system, wherein at least a portion of an input panel associated with the application program is displayed by the computer system, and wherein the input panel includes at least a first input portion and a second input portion; (b) receiving user input through the input panel; (c) determining if the user input is directed toward one of the first input portion or the second input portion; (d) sending a gesture profile from the application program to an operating system of the computer system at least when it is determined that the user input is directed toward one of the first input portion or the second input portion, wherein the gesture profile includes a first gesture profile when the user input is determined to be directed toward the first input portion, and wherein the gesture profile includes a second gesture profile when the user input is determined to be directed toward the second input portion; and (e) setting at least one gesture recognition parameter based on the sent gesture profile. Again, the gesture profile and/or the expected gesture input types may take on the various forms described above.

Additional aspects of this invention relate to systems for receiving and/or processing gesture input (e.g., input via a pen in a pen-based computing system). Such systems may include: (a) an input system for receiving user input (e.g., a digitizer, a display screen, etc.); and (b) a processor system programmed and adapted to: (i) run an application program, (ii) receive a gesture profile from the application program, wherein the gesture profile defines an expected input gesture type for at least a first portion of an input panel for the application program, wherein the expected input gesture type includes at least one member selected from the group of: an exclusive expected input gesture type, an excluded input gesture type, a preferential expected input gesture type, and a non-preferential expected input gesture type, and (iii) set at least one gesture recognition parameter for use when receiving user input directed to the first portion of the input panel based on the gesture profile. Again, the gesture profile and/or the expected gesture input types may take on the various forms described above.

Still additional aspects of this invention relate to other systems for receiving and/or processing gesture input (e.g., input via a pen in a pen-based computing system). Such systems may include: (a) an input system for receiving user input; and (b) a processor system programmed and adapted to: (i) run an application program, (ii) render at least a portion of an input panel associated with the application program, wherein the input panel includes at least a first input portion and a second input portion, (iii) determine if the user input is directed toward one of the first input portion or the second input portion, (iv) receive a gesture profile from the application program at least when it is determined that the user input is directed toward one of the first input portion or the second input portion, wherein the gesture profile includes a first gesture profile when the user input is determined to be directed toward the first input portion, and wherein the gesture profile includes a second gesture profile when the user input is determined to be directed toward the second input portion, and (v) set at least one gesture recognition parameter based on the gesture profile. Again, the gesture profile and/or the expected gesture input types may take on the various forms described above.

Additional aspects according to the invention relate computer-readable media including computer-executable instructions stored thereon for processing gesture input, including computer-executable instructions for performing various gesture processing methods and operating various gesture processing systems, including the various systems and methods described above.

B. Dynamic and/or Self-Calibration Processing

Other aspects of the present invention relate to methods, systems, and computer-readable media for dynamic and/or self-calibration processing, e.g., in pen-based computing systems. Such methods may include: (a) receiving plural user inputs directed toward a first target; (b) determining first offset data for at least some of the plural user inputs directed toward the first target, wherein the first offset data indicates a difference in at least one of distance or direction between a visual location of the first target on a display device and a hardware location on a digitizer corresponding to the visual location of the first target; (c) receiving plural user inputs directed toward a second target; (d) determining second offset data for at least some of the plural user inputs directed toward the second target, wherein the second offset data indicates a difference in at least one of distance or direction between a visual location of the second target on the display device and a hardware location on the digitizer corresponding to the visual location of the second target; (e) determining if the first offset data differs from the second offset data by more than a threshold amount; and (f) changing at least some calibration data associated with the second position, in at least some instances, when the first offset data differs from the second offset data by more than the threshold amount. The various user inputs may be directed to the various target regions and received by the input system without entering or activating a dedicated or special calibration application, program, or routine (e.g., an application, program, or routine expressly and/or solely requiring user input for calibration purposes).

Additional aspects of this invention relate to methods, systems, and computer-readable media for dynamic and/or self-calibration processing that include: (a) collecting offset data based on plural user inputs directed toward plural portions of an input panel, wherein the offset data indicates a difference in at least one of distance or direction between a visual location of a target on a display device for an individual user input and a hardware location on a digitizer corresponding to the respective visual location for the respective target for the respective individual user input, and wherein the plural user inputs are received without entering a dedicated or special calibration application, program, or routine; (b) determining whether to change calibration data associated with at least one portion of the input panel based on the offset data; and/or (c) changing calibration data associated with a first portion of the input panel, e.g., when the offset data associated with the first portion of the input panel differs by more than a threshold amount from the offset data associated with one or more other portions of the input panel.

At least some systems for dynamically and/or self-calibration processing in accordance with examples of this invention may include: (a) an input system, including a digitizer, for receiving user input directed toward a first target located or displayed at a first position of an input panel and for receiving user input directed toward a second target located or displayed at a second position of the input panel; (b) a display device for displaying at least a portion of the input panel; and (c) a processor system programmed and adapted to: (i) determine first offset data for at least some of the user input directed toward the first target, wherein the first offset data indicates a difference in at least one of distance or direction between a visual location of the first target on the display device and a hardware location on the digitizer corresponding to the visual location of the first target, (ii) determine second offset data for at least some of the user input directed toward the second target, wherein the second offset data indicates a difference in at least one of distance or direction between a visual location of the second target on the display device and a hardware location on the digitizer corresponding to the visual location of the second target; (iii) determine if the first offset data differs from the second offset data by more than a threshold amount, and (iv) change at least some calibration data associated with the second position, in at least some instances, when the first offset data differs from the second offset data by more than the threshold amount. The user input directed toward the first target and utilized in this system may be entered and/or received without entering a dedicated or special calibration application, program, or routine.

Still additional systems for dynamic and/or self-calibration processing in accordance with examples of this invention may include: (a) an input system, including a digitizer, for receiving user input directed toward plural portions of an input panel; (b) a display device for displaying at least a portion of the input panel; and (c) a processor system programmed and adapted to: (i) collect offset data based on the user input, wherein the offset data indicates a difference in at least one of distance or direction between a visual location of a target on the display device for an individual user input and a hardware location on the digitizer corresponding to the respective visual location of the respective target of the respective individual user input, and wherein the user input is received without entering a dedicated or special calibration application, program, or routine, and (ii) determine whether to change calibration data associated with at least one portion of the input panel based on the offset data. Again, the calibration data associated with a portion of the input panel may be changed, e.g., when the offset data associated with that portion of the input panel differs by more than a threshold amount from the offset data associated with one or more other portions of the input panel.

Additional aspects of the invention relate to computer-readable media including computer-executable instructions stored thereon for performing various self-calibration methods and/or operating various self-calibration systems, including systems and methods like those described above.

III. EXAMPLE HARDWARE

Figure 1:
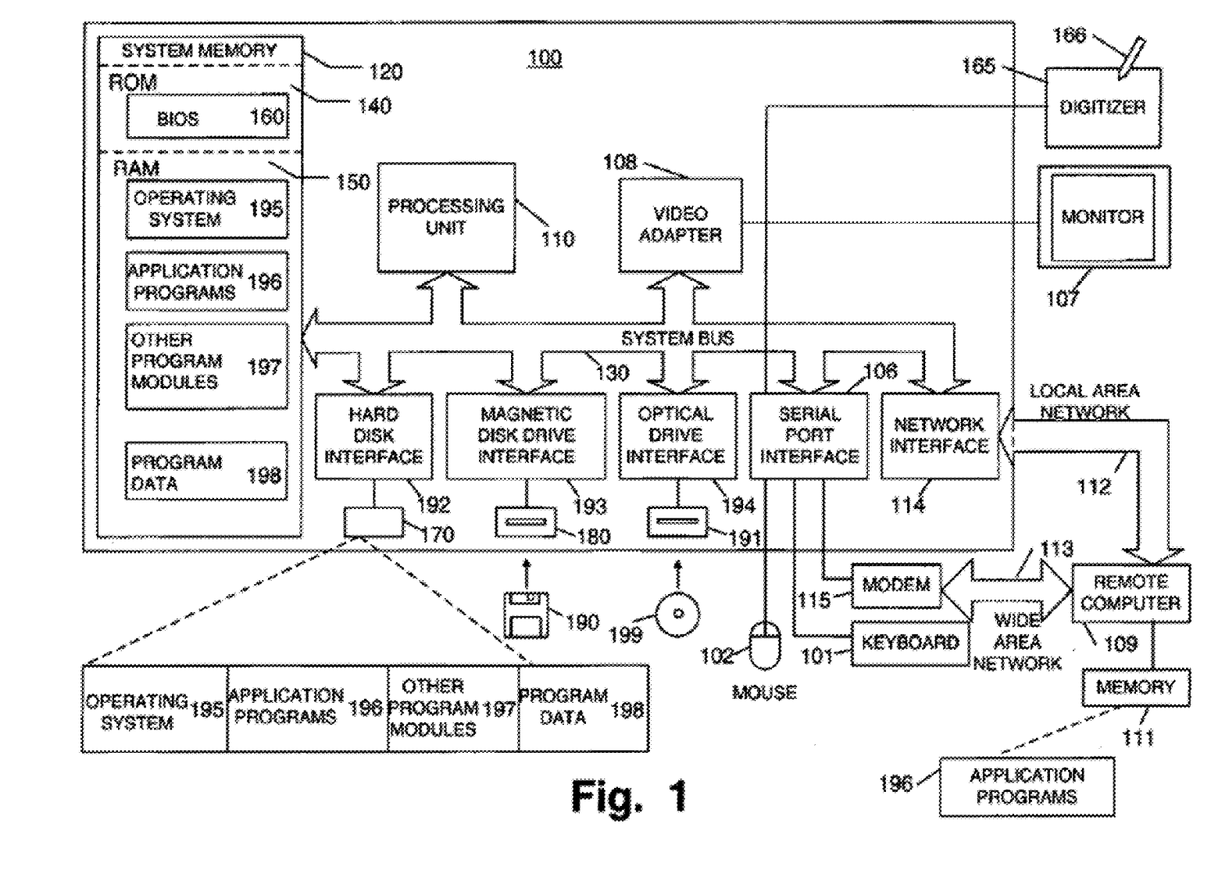
FIG. 1 illustrates a schematic diagram of a general-purpose digital computing environment in which certain aspects of the present invention may be implemented.

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide non-volatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
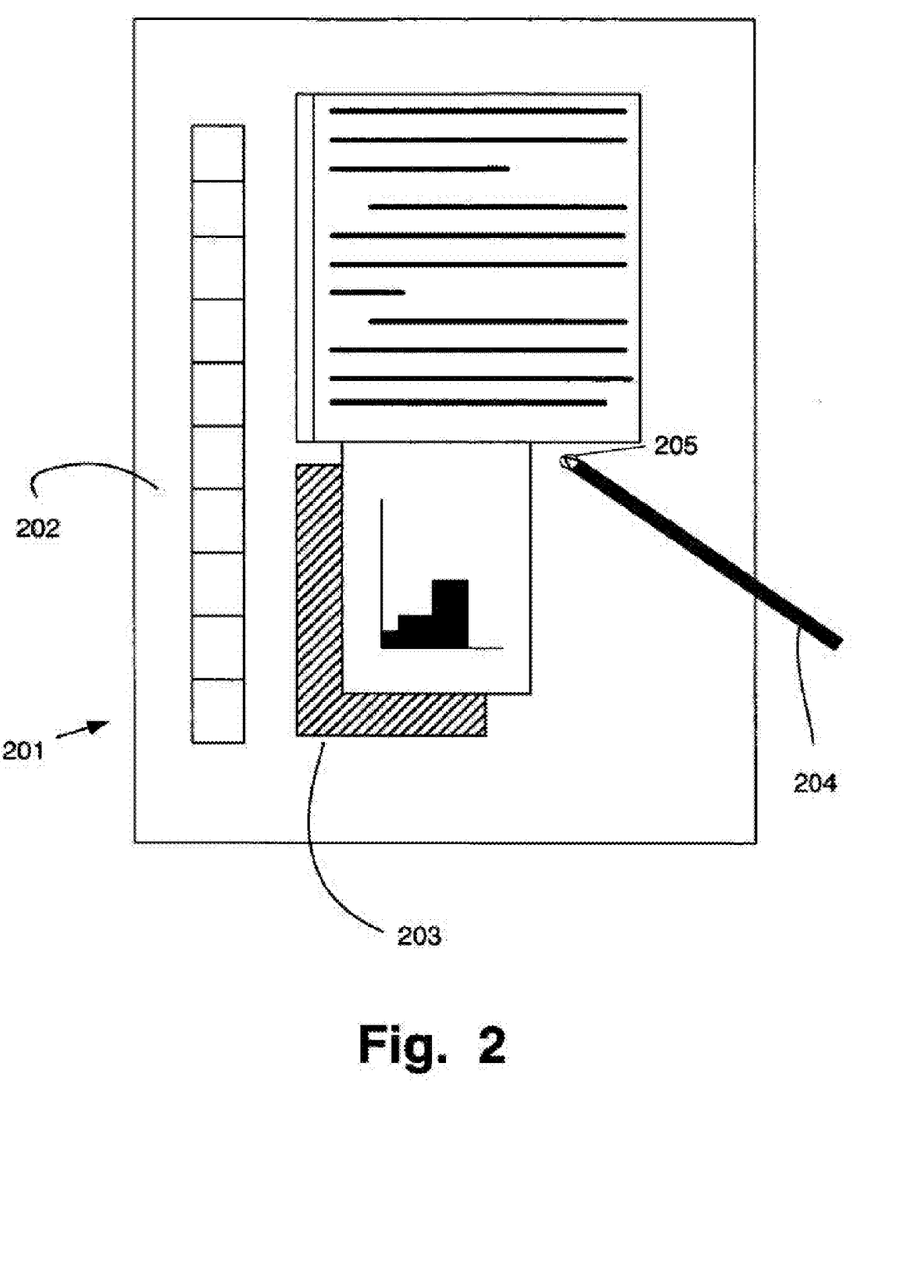
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as Fine-Point Innovations Co.) or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus.

The invention now will be described in conjunction with the remaining figures, which help illustrate various example features and aspects of the invention and help explain the invention. The specific figures and information contained in this detailed description should not be construed as limiting the invention.

IV. EXAMPLE SYSTEMS, METHODS, AND COMPUTER-READABLE MEDIA ACCORDING TO THE INVENTION

A. Processing for Distinguishing User Input Device Gestures

Figure 3:
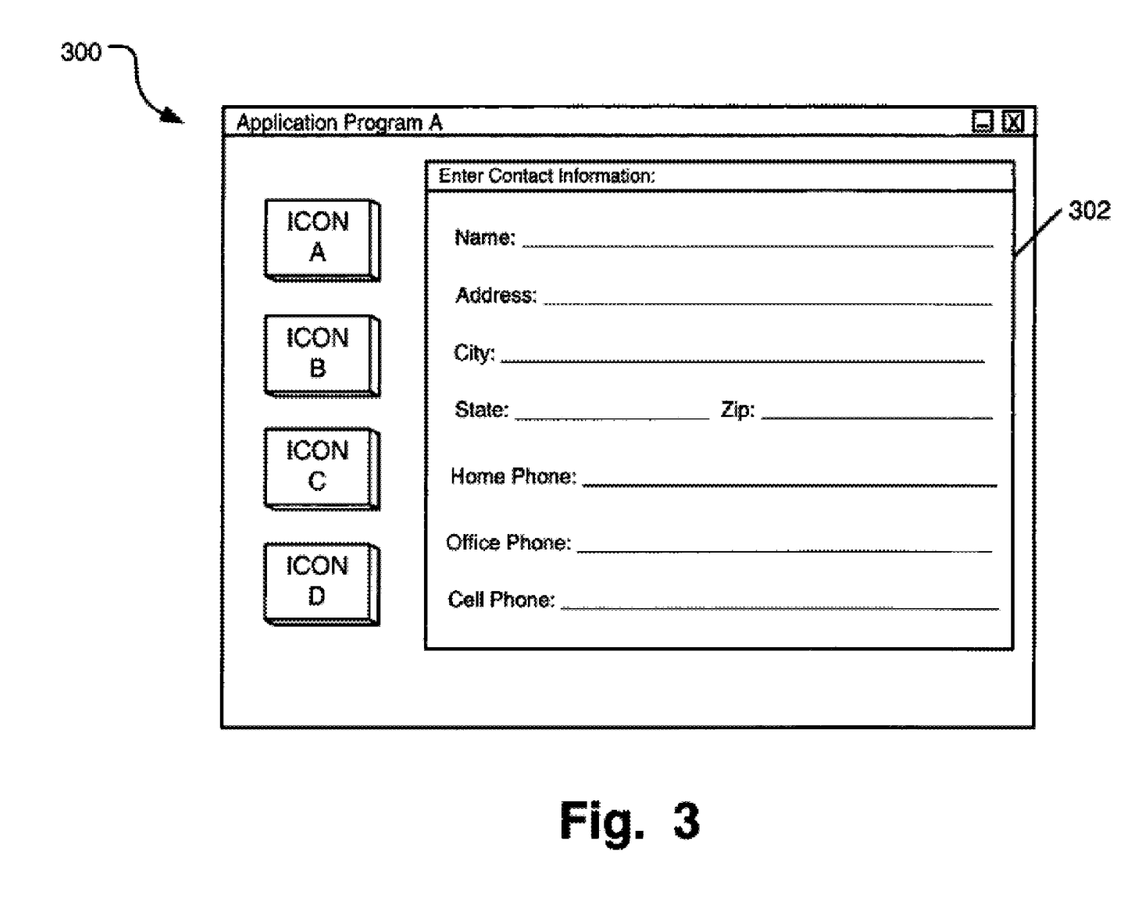
FIG. 3 illustrates an example input panel that helps illustrate various features of pen input gesture processing aspects according to this invention.

As described above, aspects of the present invention relate generally to systems and methods for processing input gestures from a user input device, e.g., from a pen in a pen-based computing system. FIG. 3 illustrates an example display of an input panel 300 generated by an application program running on a pen-based computing system. Various distinct portions of the input panel are shown in FIG. 3, namely, icons A through D, which may receive mouse button click and/or pen tap input, and the form portion 302, which may receive keyboard (hard or soft) and/or electronic ink input. If desired, individual portions of the form portion 302 could constitute separate input panel "portions." Of course, any number of input panel portions may be provided in a display and/or by an application program without departing from this invention.

In some conventional pen-based computing systems, as new input was being entered into the system using the pen, the operating system would delay processing the pen input until it determined the type of input the user desired (e.g., whether the user intended to enter tap input, drag operation input, press-and-hold activation input, ink entry input, double tap input, etc.). By delaying processing and balancing various threshold parameters associated with the typical pen input (e.g., pen-down time length, pen movement during a pen-down event, etc), the system eventually would make a determination of the type of input gesture desired, and once this determination was made, it would process all of the input data from the beginning of the pen-down event, if necessary.

Aspects of the present invention take advantage of the fact that in at least some application programs, and/or in at least some areas or portions of an input panel for an application program, a user will never do certain things, and/or the user is much more likely do some things and much less likely to do other things. Accordingly, application programs may "expect" certain types of input at or within certain portions of an input panel generated by the application program. For example, within buttons (such as icons A through D shown in FIG. 3), a user typically will never draw or enter electronic ink, but he or she is very likely to tap the button (e.g., as a single "click" action), and/or, in at least some instances, he or she may double tap or activate a "press-and-hold" gesture. As another example, within a drawing or electronic ink entry surface (such as in the form portion 302 shown in FIG. 3), a user will never (or at least rarely) tap or double tap etc. As still other examples of expected input types, within a start menu, task bar, or other input panel display including buttons, menu items, or "icons," users are much more likely to tap the buttons, menu items, or icons, although they also may wish to "drag" these elements to other locations in the interface. Users typically would not (or in some cases, would never) intend to insert electronic ink on such buttons, menu items, or icons. As still another example, some input panels include closely spaced icons or menu items. In such systems, users may be expected to single tap these targets, but they may not be very likely to want to double tap on them (they may, however, wish to single tap on two closely spaced elements in rapid succession).

In accordance with at least some examples of this invention, the application program can communicate information to the operating system (e.g., a "system gestures profile") that informs the operating system of the type of input, such as a type of input gesture, to expect at a given time (e.g., depending on the currently active mode of operation) and/or within a given portion of an input panel (e.g., an "expected input gesture type" for that time and/or location). As examples, the application program may send the operating system a system gestures profile that indicates that at least some portion of an input panel: (a) is expected to receive one exclusive type of input (an "exclusive expected input gesture type," such as tap input or electronic ink input), (b) is expected to never receive one or more types of input (an "excluded input gesture type," such as "cannot receive ink," "cannot receive a tap," etc.), (c) is more likely to receive one or more types of input as compared to other types, even though other types of input might be possible (a "preferential expected input gesture type"), and/or (d) has no preferential type of input expected (a "non-preferential expected input gesture type," e.g., one type of input is substantially as likely to be received as any other type of input). Once the system gestures profile is received, the operating system may set or adjust at least one gesture recognition parameter (or threshold) for use when receiving user input directed to the portion of the input panel to which the system gestures profile relates. More detailed examples follow.

As one example based on FIG. 3, the application program may "inform" the operating system, via the "system gestures profile," that input received in the portion of the input panel 300 corresponding to icons A through D (e.g., directed to the area of the input panel 300 occupied by the icons A-D) is more likely to constitute a tap operation than other gestures, such as a double tap, a press-and-hold action, or a dragging action. Additionally or alternatively, the application program may "inform" the operating system, via the "system gestures profile," that input directed to or received in the portions of the input panel corresponding to any of icons A through D in FIG. 3 cannot constitute electronic ink input (e.g., electronic ink may be an "excluded input gesture type" at the locations of the icon portions of the input panel 300).

Based on the information contained in the system gestures profile, the operating system may change or adjust various gesture recognition timing parameters and/or other thresholds to optimize the manner in which different potential input gestures can be distinguished from one another given the expected input types. For example, if a portion of the input panel is expected to predominantly receive single tap input, but also possibly could receive icon location dragging input, double tap input, and/or press-and-hold input, and cannot possibly receive electronic ink input (such as icons A through D in the example of FIG. 3 described above), when pen input is received within or directed toward the locations of icons A through D on the input panel, the operating system can be advised of the expected input types by the application program, and the operating system then can set its parameters to preferentially distinguish the input between the most likely tap input vs. the less likely double tap, drag, and/or press-and-hold inputs, without considering the possibility that the input might constitute electronic ink input.

As a more concrete example, assume that within a certain area of an input panel (e.g., icons A-D in input panel 300 of FIG. 3), pen input in an application program may take on the following forms: (a) a single tap, (b) a double tap, (c) activating a dragging operation, and (d) activating a press-and-hold operation, but the single tap input is much more likely than the other types of input. For a conventional operating system, which operates on the premise that all of these potential types of input are equally likely, the following example parameters and/or thresholds may be used by the operating system in distinguishing the various potential types of input:

(A) A single tap may be distinguished from a double tap (assuming that both "tap" events have time and movement characteristics corresponding to a tap gesture) when a second pen-down event closely follows an initial pen-down event in both time and location (e.g., if a second pen-down event occurs within 0.25 seconds and within a 4 pixel radius of an initial pen-down event, a double tap action is activated, otherwise two single tap actions or a single tap and other appropriate action is performed);

(B) A single tap may be distinguished from a dragging operation due to the length of the pen-down event and/or the amount of movement during the pen-down event (e.g., if the pen-down event lasts longer than 0.25 seconds and/or if the pen moves more than 4 pixels during the event, a dragging operation is activated, otherwise single tap action is activated); and (C) A single tap may be distinguished from a press-and-hold operation due to the time length of the pen-down event provided that less than a predetermined amount of pen movement occurs during the pen-down event (e.g., if the pen-down event lasts longer than 0.25 seconds and the pen moves less than 4 pixels during the event, a press-and-hold operation is activated, otherwise single tap action is activated).

While systems and methods according to examples of the invention still may use these same general parameters and thresholds to distinguish one input gesture from the other, at least in some instances, the operating system also may change or adjust one or more of these parameters and thresholds to preferentially and/or more quickly recognize the more likely type of input as opposed to the other types of input, based on the system gestures profile information sent from the application program. In other words, in a portion of an input panel in which one type of input is preferentially expected, the operating system may adjust the parameters or thresholds such that the user will have to take more care to activate the less likely input types. Any desired threshold or parameter may be changed and/or adjusted in response to a system gestures profile without departing from the invention. For example, the changed parameters or thresholds may include at least one member selected from the group of: a minimum pen movement threshold distance, a maximum pen movement threshold distance, a minimum pen-down threshold time, a maximum pen-down threshold time, a minimum consecutive pen-down spacing threshold distance, a maximum consecutive pen-down spacing threshold distance, a minimum consecutive pen-down time difference threshold, and a maximum consecutive pen-down time difference threshold. Additionally or alternatively, if desired, new parameters or thresholds may be included for consideration and/or some parameters or thresholds may be eliminated from consideration in response to receipt of a system gestures profile.

Returning to the more specific example above in which an application program sends a system gestures profile to an operating system indicating that icons A through D of input screen 300 in FIG. 3 will preferentially receive single tap input, but also possibly could receive double tap, press-and-hold, or drag input, the operating system may adjust or change the thresholds and parameters, for example, as described below:

(A) A single tap may be distinguished from a double tap (assuming both "tap" events have time and movement characteristics corresponding to a tap gesture) based on the following example: if a second pen-down event occurs within 0.15 seconds and within a 2 pixel radius of the initial pen-down event, a double tap action is activated, otherwise two single taps or a single tap and other appropriate action are performed (thereby requiring the user to more quickly and more precisely conduct the double tap action if a double tap is intended and making activation and recognition of the single tap action easier, as compared to the non-preferential example described above);

(B) A single tap may be distinguished from a dragging operation based on the following example: if the pen-down event lasts longer than 0.35 seconds and/or if the pen moves more than 6 pixels during the pen-down event, a dragging operation is activated, otherwise single tap action is activated (thereby making the user drag the object for a longer time and/or a longer distance to activate a drag operation and making activation and recognition of the single tap action easier, as compared to the non-preferential example described above); and (C) A single tap may be distinguished from a press-and-hold operation based on the following example: if the pen-down event lasts longer than 0.35 seconds and the pen moves less than 2 pixels during the event, a press-and-hold operation is activated, otherwise single tap action is activated (thereby making the user hold the pen down longer and in a more stable location to activate the press-and-hold operation and making activation and recognition of the single tap action easier, as compared to the non-preferential example described above).

Of course, different and appropriate adjustments may be made to the various thresholds and/or parameters in the event that the system gestures profile sent by the application program to the operating system indicates that a portion of the input panel preferentially will receive ink entry, double tap, press-and-hold, or dragging operations, so that these gestures will be more easily recognized and/or that the user will have to act more precisely or longer to activate one of the other non-preferred input types in that portion of the input panel.

If the system gestures profile sent by the application program to the operating system indicates that a specific portion of the input panel does not have a preferential expected gesture type (e.g., a specific portion of the input panel is designated as a non-preferential input gesture type, no system gestures profile is sent for the input panel or a portion thereof, etc.), the operating system may leave the tap vs. double tap vs. press-and-hold vs. dragging operation vs. electronic ink entry parameters and thresholds unchanged from their conventional or default settings (e.g., the "conventional" settings described above). As another example, if certain operations are not possible within the portion of the input panel (such as press-and-hold or dragging operations), the system gestures profile may indicate to the operating system that these gestures are not possible (e.g., a specific portion of the input panel is designated as having "excluded input types"), and the operating system can adjust the input recognition parameters or thresholds for this portion of the input panel such that these potential input operations need not be considered.

As still another example, some portions of an input panel may be capable of receiving at least both tap input and electronic ink input. Conventional operating systems may distinguish between these types of input based on: (a) the length of the pen-down event (e.g., longer than 0.25 seconds is considered electronic ink entry, less than 0.25 seconds is considered a tap) and/or the amount of movement during the pen-down event (e.g., more than 4 pixel movement is considered electronic ink entry, less than 4 pixel movement is considered a tap). When an application program sends a system gestures profile to the operating system indicating that a portion of the input panel will "preferentially" receive tap input, the operating system may adjust these thresholds or parameters for that portion of the input panel, for example, as follows: (a) a pen-down event lasting longer than 0.35 seconds is considered electronic ink entry and less than 0.35 seconds is considered a tap, and/or pen movement during a pen-down event of more than 6 pixels is considered electronic ink entry and less than 6 pixels is considered a tap (thereby making the user hold the pen down longer and/or move it further to enter electronic ink and making activation and recognition of the tap action easier, as compared to the non-preferential example described above). On the other hand, when an application program sends a system gestures profile to the operating system indicating that a portion of the input panel will "preferentially" receive electronic ink input, the operating system may adjust these thresholds or parameters for that portion of the input panel, for example, as follows: (a) a pen-down event lasting longer than 0.15 seconds is considered electronic ink entry and less than 0.15 seconds is considered a tap, and/or pen movement during a pen-down event of more than 2 pixels is considered electronic ink entry and less than 2 pixels is considered a tap (thereby making the user more quickly and precisely produce a tap action when desired and making entry of electronic ink easier, as compared to the non-preferential example described above). If the system gestures profile sent by the application program to the operating system indicates that a portion of the input panel does not have a preferential expected gesture type (e.g., a non-preferential input gesture types, no profile is sent, etc.), the operating system may leave the ink vs. tap parameters and thresholds unchanged from their conventional or default settings (e.g., longer than 0.25 seconds and/or more than 4 pixel movement is considered electronic ink entry, in the example above).

As still an additional example, the application program may send a system gestures profile to the operating system that indicates that at least some portion of the input panel will exclusively receive one type of input (e.g., an "exclusive expected input gesture type," such as single taps only, electronic ink only, etc.). In such an instance, systems and methods according to examples of this invention can immediately recognize any input received in that portion of the input panel as the exclusive expected input type, and immediately begin processing the input in that manner. By this same token, the system gestures profile also may indicate to the operating system that at least some portion of the input panel cannot receive one or more types of input (e.g., an "excluded expected input gesture type"), and thus the operating system can take appropriate steps to eliminate collection of data and/or evaluation of the parameters required for activating these gesture types and/or distinguishing these gesture types from others, if appropriate.

The system gestures profile may set various portions of the input panel corresponding to an expected input gesture type in any desired way without departing from this invention. For example, a given system gestures profile may correspond to a specific portion of an input panel (such as a button, a window, a row, a column, etc., e.g., defined by X,Y coordinates or other coordinates on the display screen, digitizer or the like), to an entire input panel, to any portion of the application program, to regions by name or title, etc. Also, the system gestures profile may have a permanent or temporary effect within a given portion of the input panel. For example, if desired, the expected gesture input type for a given portion of the input panel may change over time (e.g., depending on earlier user inputs, previous action or processing, the system's presently active mode of operation, etc.). Therefore, the system gestures profile sent by the application program for a specific portion of the input panel also may change over time to correspond to the changes in the expected gesture input type at different times.

The transfer of the system gestures profile from the application program to the operating system also may occur in any desired manner and/or in response to any desired stimuli without departing from the invention. For example, in some examples of the invention, the application program may send information indicating that various features may simply be enabled or disabled within a certain input panel and/or a portion thereof (e.g., enable or disable press-and-hold, etc.). In such systems, part of the information sent from the application program to the operating system may simply include information in a bit to enable (a "1" value) or disable (a "0" value) a specific feature. In some example systems and methods, the operating system may send a message to the application program (e.g., as it opens, after it opens, etc.) requesting any system gestures profile data, and the application program may respond indicating any exclusive, excluded, or preferred gesture types for one or more input panel portions. As another example, a registry of information may be transmitted from the application program to the operating system, at any appropriate time, indicating any exclusive, excluded, or preferred gesture types for one or more input panel portions. The various input panel portions may be identified, for example, by X,Y coordinate data on the digitizer (e.g., a given portion's location on the screen or digitizer), by an input panel portion or window title, and/or in any other desired manner without departing from the invention.

As additional examples, a system gestures profile may be sent to the operating system at the time the application program is launched, whenever a specific function, window, or portion of an application program is launched, opened, or activated, or the like. Such system gestures profiles may send information relating to all portions of the input panel or application program, or they may include information relating to only one or more individual portions of the input panel or application program. In some examples of the invention, the system gestures profile will be sent as an input panel or window property, as a style, or as a message, e.g., whenever the input panel or some portion of it is opened, whenever some function or feature is activated, whenever the necessary information is sent to the operating system to render the information to be included on the display screen, or the like.

An individual input panel (such as panel 300 in FIG. 3) or application program may have multiple "portions" associated with it, and the same or different system gestures profiles may be used in the different portions. For example, input panel 300 may have one system gestures profile used for icons A through D (e.g., single tap preferred, electronic ink excluded, as described above) and a different system gestures profile used for the form portion 302 (e.g., electronic ink exclusive, electronic ink preferred, tap excluded, etc.). Optionally, if appropriate, different system gestures profiles may be used for the individual icons A through D. Also, if appropriate and desired, various regions or portions within the form portion 302 may have different profiles associated with them. If desired, some portions of the input panel having one system gestures profile may overlap with and/or encompass other portions of the input panel having another system gestures profile.

As noted above, a system gestures profile in accordance with the invention may be sent by the application program to the operating system at any desired time and/or in response to any desired stimuli without departing from the invention. As still additional examples, in accordance with at least some examples of this invention, system gestures profiles may be sent from the application program to the operating system in response to one or more of a pen hover action or a pen-down event. For example, as a user moves the pen to enter input into the pen-based computing system and the pen approaches the screen or digitizer (e.g., in a hover posture), the location of the pen may be sensed by the digitizer, as is known in the art (e.g., using active pens, etc.). The location of the pen on the X, Y coordinates (or other coordinates) of the digitizer during this hover action (e.g., the pen's "target" location) may be sensed, and the hover action may be used to trigger transmission of the system gestures profile (if any) corresponding to the X,Y coordinates of the target (thereby preparing the operating system to receive input in this portion). If the target location moves before a pen-down event occurs, e.g., such that a different portion of the input panel having a different system gestures profile is targeted, then the new system gestures profile may be sent by the application program.

Also, as mentioned above, if desired, the system gestures profile may be sent by the application program in response to a pen-down event that begins the gesture. In example systems and methods of this type, the location of the pen-down event is fixed, thereby clearly defining the system gestures profile (if any) needed for evaluating this pen-down event. Use of the pen-down event to trigger transmission of the system gestures profile information eliminates some of the processing involved in sending gesture profiles in response to all hover actions and/or changes in hover target locations.

This portion of the specification provides more detailed examples of specific methods of implementing various features of the invention relating to processing pen input gestures, e.g., as described above. More specifically, this portion of the specification describes example definitions for pen and touch screen input profile bits that may be used, for example, in implementing improved processing of pen system gestures (such as taps, double taps, press-and-hold operations, etc.);

pen targeting improvements; touch; flicks; and the like, as described above. In general, "flicks" may constitute a substantially uni-directional pen gesture in which a user contacts the user input device with a digitizer in a quick manner and makes a short, essentially uni-directional stroke (e.g., a quick "flick" of a pen or finger on a digitizer surface). The system's response to a flick gesture may depend, for example, on the direction of movement of the finger or other input device during the flick event. Various parameters may be used in determining whether a gesture constitutes a "flick," such as the speed and/or distance of pen movement, the overall pen-down time, and the like.

As described above, in accordance with aspects of this invention, application programs may be allowed to provide input and control various pen and touch behaviors in a given application, window, or area within a window. Examples of various behaviors that can be controlled in this way are further described in the table below. This group of settings also may be referred to herein as a "local pen and touch input profile."

In this example of systems and methods in accordance with the invention, the information is local, e.g., it can be set only within a given context (e.g., within an application, a window, an area within a window, etc.), and generally it can not be set globally, everywhere, in all windows. For changing global settings in various commercially available operating systems, changes to the control panel and registry may be used.

The profile information in this example implementation flows from the application program into an input subsystem (e.g., one or more components that receive, pre-process, analyze, filter, and/or marshal input from a digitizer or other input device to the operating system or application program, such as the "Windows Ink Services Platform Tablet Input Subsystem," also known as "wisptis," available from Microsoft Corporation of Redmond, Wash., e.g., with the Microsoft® Windows XP Tablet PC Edition Version 2002). This input subsystem may obtain a set of bits from the application program that defines the profile. The flow of information can be initiated by wisptis or other input subsystem (referred to as a "pull" model), or by the application program itself (referred to as a "push" model). The "pull" model is discussed in more detail below.

In accordance with at least some examples of the invention, the profile information may be provided in the ways described below. Codepaths for these ways exist in various known operating system environments, e.g., for pen input profiles to disable press-and-hold functions. Aspects of the present invention relate to extended bit fields to accommodate additional input for system gesture improvements, targeting improvements, touch, flicks, and the like, in accordance with examples of this invention.

Use of the known HWND atom property is one method of providing an input profile. This type of profile is a per-window profile. The profile includes a 32-bit integer stored and/or available on HWND via the known SetAtom and GetAtom Windows APIs. In use, the client application program may call using the SetAtom API to provide a combination of all profiles, and/or the input subsystem (e.g., wisptis) may call the GetAtom API to retrieve the profile(s). While the specific SetAtom and GetAtom APIs are identified above, of course any desired APIs may be provided to set and/or retrieve one or more properties to be associated with a window, control, or input surface. For example, any suitable API may be developed to identify a window or input surface, e.g., in a user interface. Such APIs may be provided to send and/or receive input identifying the window or input surface, e.g., of a user interface, and they may generate, send, and/or receive output identifying properties associated with that window input surface (e.g., tap only, tap preferred, etc.).

This procedure works well for windowed controls (controls that are one control per-window) and top-level window input profiles. Use of this option may not be available in windowless areas within the application, such as in the scrollbars in the Internet Explorer® application program or in individual elements within various graphical display systems and/or application programs.

The following property may be used to generate a bitfield for turning various behaviors of a window or input panel "on" or "off": "MicrosoftTabletPenServiceProperty." This property may be set/managed as follows (C#):

```
DllImport ("user32.dll", CharSet=CharSet.Auto)]
public static extern int SetProp(
    IntPtr handle,
    string atomName,
    int data);
SetProp(
    control.Handle,
    "MicrosoftTabletPenServiceProperty",
    profile);
```

As another example, the input profile may be set using, for example, a Windows Ink Services Platform Tablet Input Subsystem message. If wisptis does not find a profile as an HWND property in this example system, it may send a WM_TABLET_QUERYSYSTEMGESTURESTATUS message to the application program. The message may be sent or relate to a particular window with X,Y coordinates within a larger window (e.g., stored in LPARAM, the X,Y are in screen coordinates). The application program may be designed to hit-test against the contents of the window, and then to compute, send, and/or determine the profile based on what is under the given point X,Y.

Two examples of the use of this procedure include: (a) the Internet Explorer® application program may hit test whether a point is over its scrollbar, over its client (trident) area, or elsewhere; and (b) an application program for generating graphical displays may hit test the visual tree and compute profiles off the dynamic properties of the element hit and its parent chain.

Here is an example of how an application program can respond to the Windows Ink Services Platform Tablet Input Subsystem message:

```
const int WM_TABLET_QUERYSYSTEMGESTURESTATUS = 0x2DB;
const int
TABLET_QUERYSYSTEMGESTURESTATUS_DISABLEPRESSANDHOLD =
0x00000001
const int
TABLET_QUERYSYSTEMGESTURESTATUS_PREFERPENTAPSOVERDRAGS =
0x00000002;
...
override void WndProc(ref Message message)
{
    switch (message.Msg)
```

-continued

```
{
    case WM_TABLET_QUERYSYSTEMGESTURESTATUS:
        Point ptScreen = new
Point(SignedLOWORD(message.LParam),
SignedHIWORD(message.LParam));
        Point ptClient = ScreenToClient(this.Handle, ptScreen);
        ... hit test ptClient ...
        ... compute "profile" for that point ...
        ... use TABLET_..._DISABLEPRESSANDHOLD,
TABLET_..._PREFERPENTAPSOVERDRAGS, etc ...
        message.Result = profile;
        break;
    default:
        base.WndProc (ref message);
        break;
    }
}
```

Bits within a profile retrieved via HWND atom property or a WM_TABLET_... QUERYSTATUS message may be laid out, for example, as described in the table below. The following is a special note on the default case in this example implementation. If HWND atom is not present and the application is not handling WM_... QUERYSTATUS messages, the message may be directed to default WndProc, which will return all zeroes as the profile. In certain cases (e.g., flicks, etc.), operating systems and/or application programs may wish to differentiate between cases in which all zeroes comes as default as compared with cases where all zeroes come because the application program explicitly set all the values to zeroes. To differentiate in this scenario, an additional special profile bit, e.g., called "Application Provided the Profile," may be used. The table follows:

| Bit | Mask | Question | Explanation |
| --- | --- | --- | --- |
| 0 | 0x00000001 | Pen or Tuouch Press-and-hold disabled? | 0: no<br>1: yes |
| 1 | 0x00000002 | Prefer pen taps over drags | 0: no (the system will pick balance of taps vs drags)<br>1: yes (the system will pick balance of taps vs. drags) |
| 2 | 0x00000004 | Prefer pen drags over taps? | 0: no (the system will pick balance of taps vs drags)<br>1: yes (drags will be smooth but taps more difficult to make) |
| 3 | 0x00000080 | --reserved for pen -- | |
| 4 | 0x00000010 | Disable pen UI? | 0: no (pen UI enabled)<br>1: yes (pen UI disabled) |
| 5-7 | 0x000000E0 | --reserved for pen -- | |
| 8 | 0x00000100 | Touch targeting object disabled? | 0: no (touch targeting object will be present)<br>1: yes (touch targeting object will be disabled) |
| 9 | 0x00000200 | Prefer touch taps over drags | 0: no (the system will pick balance of taps vs drags)<br>1: yes (the system will pick balance of taps vs drags) |
| 10 | 0x00000400 | Prefer touch drags over taps? | 0: no (the system will pick balance of taps vs. drags)<br>1: yes (drags will be smooth but taps more difficult to make) |
| 11-15 | 0x0000F800 | -- reserved for touch -- | |
| 16 | 0x00010000 | Disable flicks? | 0: no (the system will decide whether to enable flicks or not)<br>1: yes (flicks disabled) |
| 17 | 0x00020000 | Enable flicks in the presence of ink? | 0: no (flicks will not be enabled on a window that supports inking or listens to pen or stylus events)<br>1: yes (flicks will always be enabled) |
| 18 | 0x00040000 | Enable flick learning mode? | 0: no (flick learning mode disabled)<br>1: yes (flick learning mode enabled) |

| Bit | Mask | Question | Explanation |
| --- | --- | --- | --- |
| 19-30 | 0xEF000000 | -- reserved for future use -- | |
| 31 | 0x80000000 | Application explicitly provided this profile? | 0: no (the profile is default)<br>1: yes |

Generally, in at least some example implementations, the input subsystem (e.g., wisptis) will "pull" the information from the application program just before the information is necessary. Typically, this information is necessary at the very beginning of a stroke (e.g., as a pen hovers, as the pen-down event begins), so the input subsystem may be arranged to pull the information on every pen/touch-down event or on every hover event.

Notably, the message that is being sent may, in at least some instances, travel cross-process, so it also may need to synchronize with the application program's user interface thread (which may require a wait until the application program is ready to respond to the message). As a result, it is possible that the application program will not respond quickly in some instances. The default (all zeroes) profile may be used in those instances. All the questions in the profile, as shown in the Table above, may be structured in such a way that the default has an excellent chance of working. Notably, this delay case may be relatively rare such that the issue only will arise when the application program is quite busy doing other processing. The application program's user interface may appear frozen at that moment. In some instances, the profile may become somewhat "distorted" or not followed exactly in that case. This result may be seen as similar to what happens when a user uses a mouse or keyboard in an application program that is too busy.

As potential alternatives, if desired, in at least some example implementations, the profile request message may be sent earlier in time, before a pen/touch-down event, e.g., in an effort to retrieve and cache a relevant profile that can be used before the application returns with the answer.

Aspects of the present invention also relate to computer-readable media including computer-executable instructions stored thereon for performing various system gestures profile generation and use methods and/or for use in various systems having system gestures profiles, including the systems and methods described above. The computer-readable media may constitute computer-executable instructions stored on the various specific examples of computer-readable media described above.

B. Dynamic Self-Calibration Processing

As described above, additional aspects of the present invention relate generally to systems and methods for automatically and dynamically calibrating pen-based computing systems. Calibration issues can arise in pen-based computing systems because the input device or pointer is user controlled, external to, and independent from the physical computer device. Moreover, calibration issues arise because the digitizer device that recognizes the physical location of the user input is distinct from the display device (e.g., the LCD screen) that the user sees and that displays the user's interaction target. Calibration issues can be further exacerbated due to the flexible and varying ways that pen-based computing systems can be used. For example, changing the screen between a slate mode and a convertible mode (e.g., using an associated keyboard) and/or between portrait and landscape orientations can result in differences in the relative arrangement between the digitizer, the display screen, the user's view of the screen, and/or the user's interaction with the screen. Likewise, user positioning with respect to the screen during input (e.g., near vs. far, directly above vs. a more side location, etc.) can impact the relative arrangement between the digitizer, the display screen, the user's view of the screen, and/or the user's interaction with the screen. Additionally, differences between left handed and right handed user input can affect the relative arrangement between the digitizer, the display screen, the user's view of the screen, and/or the user's interaction with the screen. These factors, coupled with potential calibration issues that arise due to noise from underlying electronic components and/or due to calibration drift over time, make it desirable to provide ways to keep pen-based computing systems calibrated.

Calibration procedures in accordance with at least some examples of this invention will take place automatically, in a background thread, during normal user interaction with a pen-based computing system, and/or without entering or launching a dedicated or special calibration application or program. In other words, unlike other calibration methods (e.g., where human interaction is necessary in a dedicated program or system to generate calibration data), the "self-calibration" procedures in accordance with examples of this invention will generate calibration adjustment data automatically, in a background thread, from the manner in which the user interacts with visual input panel elements on a conventional pen-based computer display.

Figure 4:
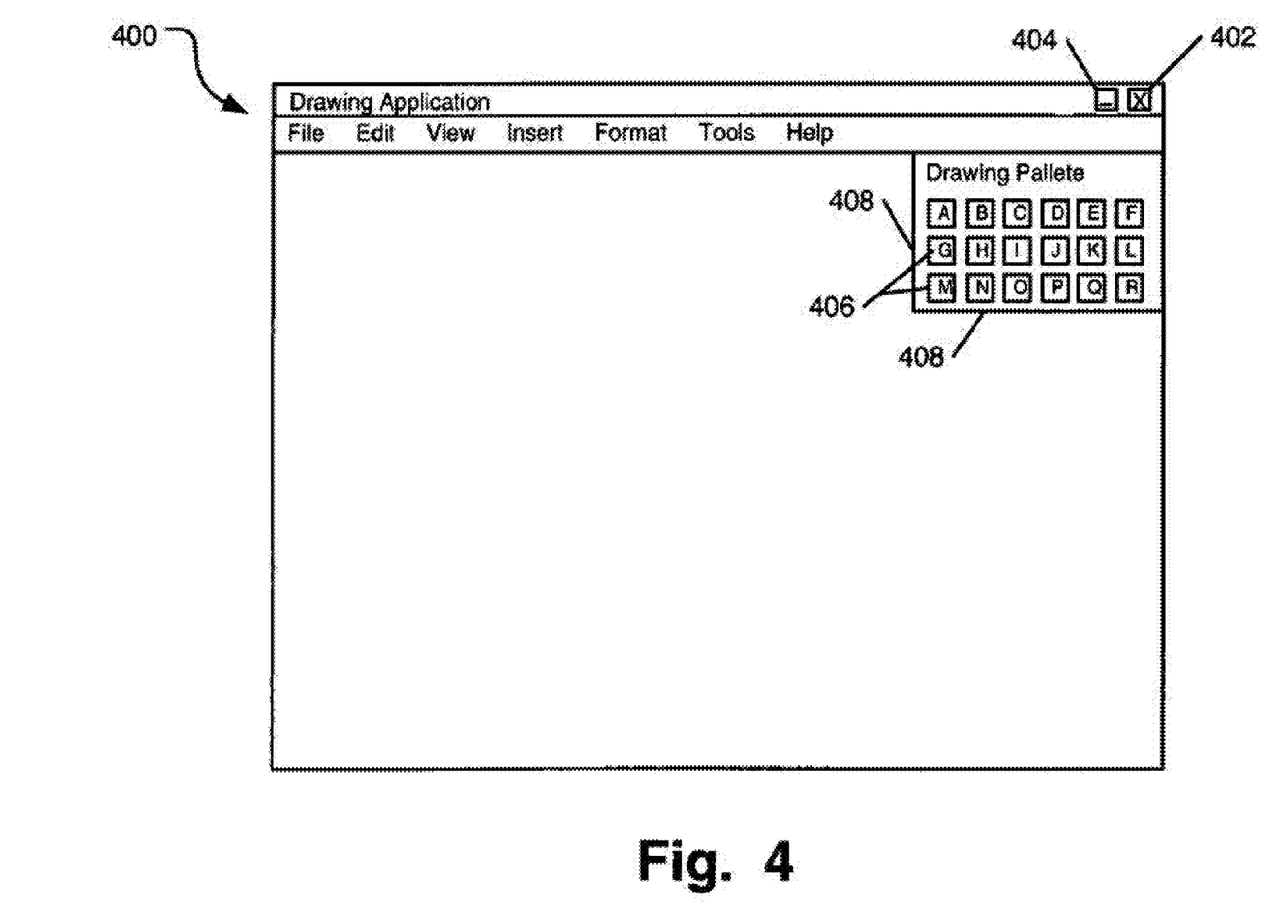
FIG. 4 illustrates an example input panel that helps illustrate various features of self-calibration processing aspects according to this invention.

As one example, small buttons, icons, or other elements present in an input panel may be used in calibration systems and methods in accordance with examples of this invention. For example, as shown in FIG. 4, as is conventional in many graphical user interfaces including those used for pen-based computing systems, the interface may include one or more small "buttons," page tabs, or icons that the user will "tap" with the pen device, such as the "close" button 402 or the maximize/minimize button 404. Additionally, individual application programs and/or the operating system interface itself may generate small buttons or icons 406 with which a user will interact. Because these buttons or the like may be quite small, one can assume that when a user interacts with these buttons (e.g., via a pen tap), the user intends to tap the pen tip at the very center of the button. The system hardware will register or determine the actual X,Y coordinates where the user interacts with the digitizer when attempting to interact with these small buttons (e.g., buttons 402 or 404) and compare this actual location with the "expected" location of the button. If the system determines that the user interacts with the digitizer at a location consistently offset from the button's center location (e.g., if he or she always or almost always taps buttons above their center and to the right of center, etc.), this fact may be an indication that the positions of the pen reported from the hardware are consistently offset from the visual screen locations and/or positions that the user is actually targeting with the pen. The system may use this offset information to change the pen-based computing system's calibration data to make the user's interaction location (display location) and the recognized digitizer location more closely correspond to one another. This offset data can be collected during use of any type of application program, and it does not require user input specially directed to a calibration program, function, or routine.

Other types of input and/or input situations may be used in the collection of information useful for calibration. For example, systems and methods according to examples of this invention might be used to monitor user input characteristics on many areas of the screen. If, for example, user inputs in most areas of the screen are on target and/or consistently offset in one manner (e.g., to the right of the center of small buttons), but in one area of the screen (e.g., one particular area of the screen, one button, etc.), the user consistently hits the pen offset and/or offset in a different manner (e.g., to the left of center of the small button), this information may indicate a calibration problem in that one particular area of the screen. Systems and methods according to examples of this invention may use this offset information to generate and apply a calibration adjustment in that area of the screen. Again, offset data of this type can be collected during use of any type of application program, and it does not require user input specially directed to a calibration program, function, or routine.

Activation of self-calibration procedures in examples of this invention is not limited to user interaction with small buttons or icons with a pen or stylus. Rather, any user input that relies upon "fine targeting" procedures may be used in aspects of the invention. For example, in many graphical user interfaces, users can change input panel window sizes, page margins, and the like, by touching the pen down on an edge of the input panel window, a margin marker, splitter bars found along docking windows, or the like, and then dragging the edge, marker, or bar to the new, desired location. Examples of size adjustable input panel edges are shown at reference number 408 in FIG. 4. User attempts to "grab" or touch down on the edge, marker, or bar that fail will result in a pen-down event in close proximity to the bar, often followed by a short drag and/or another attempt at touching down on the edge, marker, or bar. In some instances (e.g., in some ink-aware or drawing applications where a drawing surface extends adjacent to a resize bar, etc.), ink "erase" or undo actions followed shortly in time by a similar pen-down event and/or pen movement event to that previously erased or undone may be used as an indicator that the system did not correctly react the first time to "grab" the edge, bar, or marker in the manner that the user intended. Attempted user action consistently offset from the edge's true location may indicate a calibration problem, e.g., at least with respect to one axis of calibration (e.g., an offset from the X or Y axis). This information may be used by systems and methods according to examples of this invention to apply a change or adjustment to calibration data associated with at least some portion of the pen-based computing system.

Calibration changes of the types described above in accordance with examples of the invention need not occur abruptly or in response to a single user interaction with an on-screen button or other element. Rather, offset data of this type may be collected over time (e.g., over several uses of the computer, after several days or even weeks of use), through numerous user interactions with various different user interface elements, and/or at various different locations on the screen, and trends or patterns relating to the offsets during such interactions (e.g., in certain areas of the screen) may be considered and used in determining whether to make calibration adjustments and/or the extent of such adjustments. Additionally, calibration adjustments may be made gradually, over time, to better assure that the perceived offset information is accurate and to prevent an abrupt change in the user's experience with the computing system. As an example, an "iterative" calibration adjustment technique may be used to better assure that the perceived offset information is accurate and to prevent an abrupt change in the user's experience. If desired, more recently collected offset data may be weighted more heavily in determining whether to make calibration adjustments and/or the extent of such adjustments.

Aspects of the automatic calibration features of this invention also may be used in combination with at least some of the aspects of processing user input device gestures as described above. For example, if desired, an application program may "advise" the operating system where its targets are located so that the operating system could more accurately identify the valid boundaries of input device (e.g., pen tap) targets. This feature could be applied for use with any type of target, including, if desired, custom user interfaces (e.g., generated by the application program), optionally with irregular boundaries. In addition, if desired, the application program in this system (as well as the other systems described above) may include a means for "informing" the operating system that a specific "click," "tap," or "drag" operation was "successful." As one example implementation, systems and methods in accordance with examples of this aspect of the invention may "hook" the "close" button so that the application program (or optionally the operating system directly) can detect successful pen taps through the disappearance of the window associated with the close button. If the successful tap is detected by the application program, example systems and methods in accordance with this aspect of the invention will allow the application program to send information to the operating system indicating that the desired operation was successful (because the operating system itself may not know, in at least all instances, when a "click" or "tap" operation was successful in an application program). Of course, other ways of informing the operating system that a user input action in the application program was successful or unsuccessful may be used, if desired, without departing from this invention.

Finally, the present invention also relates to computer-readable media including computer-executable instructions stored thereon for performing various self-calibration methods and/or for use in various systems including self-calibration, including the systems and methods described above. The computer-readable media may constitute computer-executable instructions stored on the various specific examples of computer-readable media described above.

V. CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

What is claimed:

1. A method, comprising:
   receiving plural user inputs directed toward a first target located at a first position of an input panel;
   determining first offset data for at least some of the plural user inputs directed toward the first target, wherein the first offset data indicates a difference in at least one of distance or direction between a visual location of the first target on a display device and a hardware location on a digitizer corresponding to the visual location of the first target;

receiving plural user inputs directed toward a second target located at a second position of the input panel, the plural user inputs are received without entering a dedicated or special calibration application;

determining second offset data for at least some of the plural user inputs directed toward the second target, wherein the second offset data indicates a difference in at least one of distance or direction between a visual location of the second target on the display device and a hardware location on the digitizer corresponding to the visual location of the second target;

determining if the first offset data differs from the second offset data by more than a threshold amount; and changing at least some calibration data associated with the second position of the input panel in at least some instances when the first offset data differs from the second offset data by more than the threshold amount.

2. A method according to claim 1, wherein the plural user inputs directed toward the first target are received without entering a dedicated or special calibration program, or routine.

3. A method according to claim 2, wherein the plural user inputs directed toward the second target are received without entering a dedicated or special calibration application, program, or routine.

4. A method according to claim 1, wherein the plural user inputs directed toward the first target are received without entering a dedicated or special calibration application, program, or routine.

5. A method according to claim 1, wherein at least a portion of the plural user inputs are received via contact from a user's finger with the input panel.

6. A tangible computer-readable medium having stored thereon executable instructions that when executed by a system cause the system to perform a method, the method comprising:

receiving plural user inputs directed toward a first target located at a first position of an input panel;

determining first offset data for at least some of the plural user inputs directed toward the first target, wherein the first offset data indicates a difference in at least one of distance or direction between a visual location of the first target on a display device and a hardware location on a digitizer corresponding to the visual location of the first target;

receiving plural user inputs directed toward a second target located at a second position of the input panel, the plural user inputs are received without entering a dedicated or special calibration application;

determining second offset data for at least some of the plural user inputs directed toward the second target, wherein the second offset data indicates a difference in at least one of distance or direction between a visual location of the second target on the display device and a hardware location on the digitizer corresponding to the visual location of the second target;

determining if the first offset data differs from the second offset data by more than a threshold amount; and changing at least some calibration data associated with the second position of the input panel in at least some instances when the first offset data differs from the second offset data by more than the threshold amount.

7. A system, comprising:

an input system, including a digitizer, for receiving user input directed toward a first target located at a first position of an input panel and for receiving user input directed toward a second target located at a second position of the input panel, the user input is received without entering a dedicated or special calibration application;

a display device for visually displaying at least a portion of the input panel; and a processor system programmed and adapted to: (a) determine first offset data for at least some of the user input directed toward the first target, wherein the first offset data indicates a difference in at least one of distance or direction between a visual location of the first target on the display device and a hardware location on the digitizer corresponding to the visual location of the first target, (b) determine second offset data for at least some of the user input directed toward the second target, wherein the second offset data indicates a difference in at least one of distance or direction between a visual location of the second target on the display device and a hardware location on the digitizer corresponding to the visual location of the second target; (c) determine if the first offset data differs from the second offset data by more than a threshold amount, and (d) change at least some calibration data associated with the second position of the input panel in at least some instances when the first offset data differs from the second offset data by more than the threshold amount.

8. A system according to claim 7, wherein the user input directed toward the first target is received without entering a dedicated or special calibration program, or routine.

9. A system according to claim 8, wherein the user input directed toward the second target are received without entering a dedicated or special calibration application, program, or routine.

10. A system according to claim 7, wherein the user input directed toward the second target are received without entering a dedicated or special calibration application, program, or routine.

11. A system according to claim 7, wherein the input system for receiving user input is adapted to receive inputs via user's finger contact with the input panel.

* * * * *